United States Patent [19]

Oelke et al.

[11] 4,190,184
[45] Feb. 26, 1980

[54] METHOD OF AND APPARATUS FOR THERMALLY CUTTING GLASS

[75] Inventors: Waldemar W. Oelke, Rossford; Ralph C. Poplawsky, Sylvania, both of Ohio

[73] Assignee: Libbey-Owens-Ford Company, Toledo, Ohio

[21] Appl. No.: 936,140

[22] Filed: Aug. 23, 1978

[51] Int. Cl.² .................. C03B 33/02; B26F 3/12
[52] U.S. Cl. ............................ 225/2; 225/93.5; 225/96.5; 225/103
[58] Field of Search ............... 225/2, 93.5, 96.5, 103

[56] References Cited
U.S. PATENT DOCUMENTS

| 3,730,408 | 5/1973 | Dahlberg et al. | 225/2 |
| 3,790,054 | 2/1974 | Dahlberg et al. | 225/93.5 |

*Primary Examiner*—Frank T. Yost
*Attorney, Agent, or Firm*—Collins, Oberlin & Darr

[57] ABSTRACT

A method of and apparatus for thermally severing a thick glass sheet by applying localized heat to one surface of the sheet along an intended line of cut and flexing the sheet adjacent the exit end of said intended line of cut to assist in the severance of the sheet and confining the cut to such line at the exit end thereof.

12 Claims, 5 Drawing Figures

4,190,184

METHOD OF AND APPARATUS FOR THERMALLY CUTTING GLASS

BACKGROUND OF THE INVENTION

The present invention relates generally to thermal cutting and, more particularly, to the true linear thermal severing of relatively thick glass plates or sheets.

The art of thermally severing thick glass sheets or plates has become increasingly popular in recent years as an alternative to the arduous and more expensive cutting procedures conventionally employed. One persistent problem encountered in thermally severing thick glass sheets or plates is the inability to repeatedly form accurate straight cuts. Often, the fracture or cut tends to deviate somewhat from the intended line of cut and also leaves rough, jagged or otherwise irregular severed edges, as well as edges that are non-perpendicular relative to the major surfaces of the sheet. The method and apparatus disclosed in U.S. patent application Ser. No. 767,051, filed Feb. 9, 1977, now U.S. Pat. No. 4,113,162, and assigned to the same assignee as the present invention, provided a solution to these problems by utilizing an electrical resistance wire element maintained in continuous, conductive contact against a surface of the glass to be cut for concentrating or localizing heat along the intended line of cut in conjunction with a mechanical assist for spreading the severed glass portions apart as the thermally induced running cut progressed along the sheet. The mechanical assist prevented dissipation of a significant portion of the thermally induced energy generated in the resistance wire otherwise required to move the severed portions apart and thereby reserved substantially all such thermal energy for use in effecting a true linear cut. However, just prior to reaching the remote or trailing end of the sheet, say within about one inch of the trailing edge of a sheet having a linear dimension on the order of 140–200 inches for example, the running cut frequently tends to curve or flare away from the intended line of cut. This problem of flaring is not peculiar to the above-described process, but is a common problem associated with virtually all known thermal cutting techniques. Generally, such flares can be condoned because the lengths of the severed glass portions are normally trimmed to size along a transverse line inwardly of where the flare starts deviating from the intended line of cut. Nevertheless, it is often desirable to form a true linear cut from starting edge to trailing edge of the blank sheet, and the present invention contemplates avoiding entirely any such deviation or flare at the trailing or exit end of a running cut.

SUMMARY OF THE INVENTION

Accordingly, it is an object of the present invention to provide a method of thermally severing thick glass sheets by incorporating steps for preventing flares or deviations from the intended line of cut at the trailing end thereof.

It is another object of this invention to provide a new and improved apparatus for thermally cutting thick glass sheets in a manner consistently forming true linear cuts from end to end.

It is a further object of the present invention to provide in the foregoing apparatus means at the trailing end of the intended line of cut for flexing the glass sheet along such intended line of cut to ensure glass severance along such intended line of cut at the trailing end thereof.

The foregoing and other objects, advantages, and characterizing features of the present invention will become clearly apparent from the ensuing detailed description thereof considered in conjunction with the accompanying drawings wherein like reference characters denote like parts throughout the various views.

DESCRIPTION OF THE PREFERRED EMBODIMENT

Figure 1:
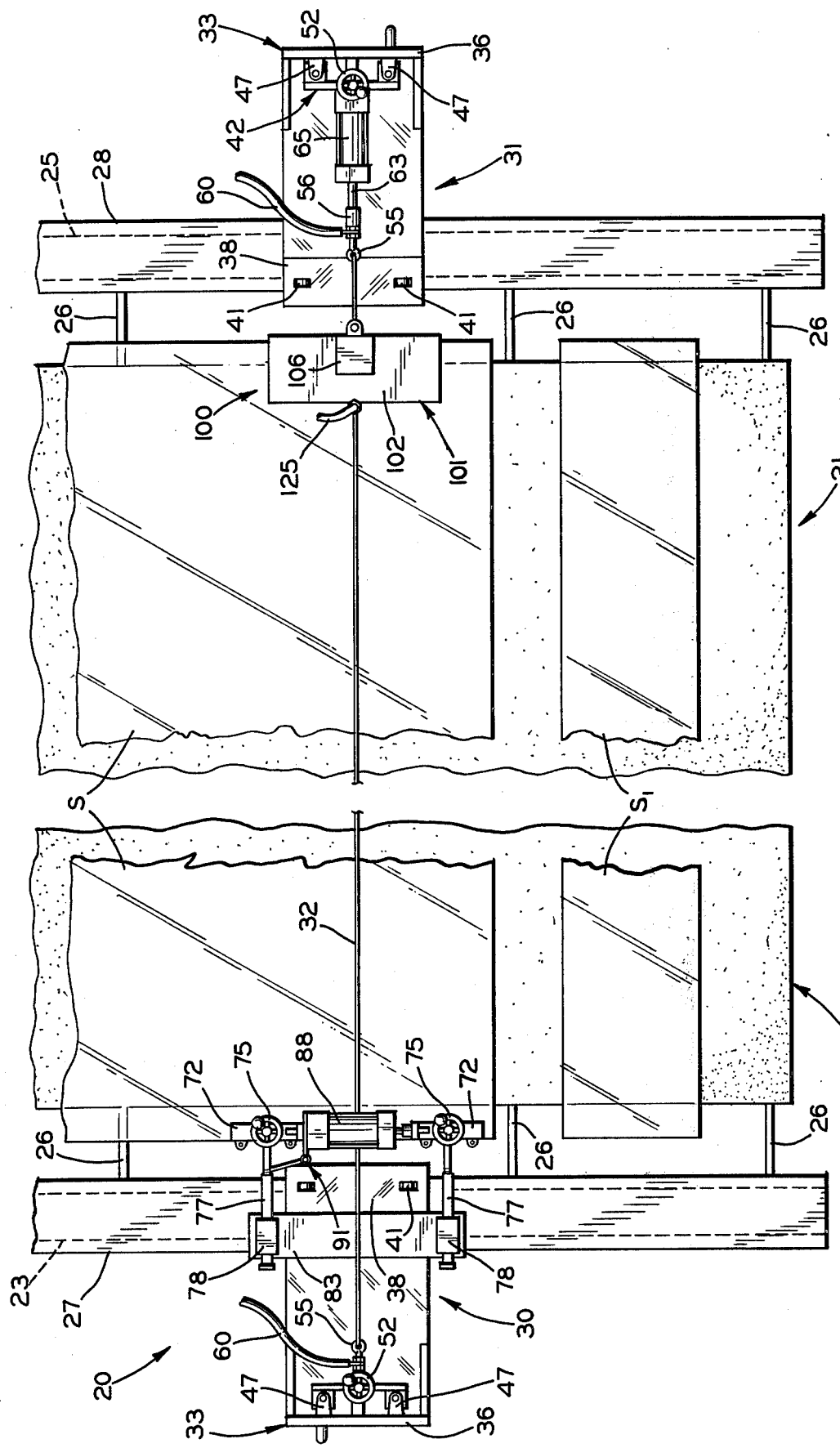
FIG. 1 is a fragmentary top plan view of a thermal severing apparatus embodying the novel features of the present invention.

Referring now in detail to the illustrative embodiment depicted in the accompanying drawings for carrying out this invention, there is shown in FIG. 1 a glass cutting apparatus, comprehensively designated 20, mounted on a glass supporting table generally designated 21, having the usual support legs and structural members (not shown) constituting the frame 22 of the table. A pair of structural I-beams 23 and 25 are secured to frame 22 by a plurality of connecting members 26 and extend generally parallel to the opposite marginal edges of table 21 in spaced relation thereto. The beams 23 and 25 are provided with elongated plates 27 and 28 coextensive therewith welded or otherwise fixedly secured to the upper flanges thereof and which project laterally outwardly past the flanges to form guide rails for carriages 30 and 31, respectively, adpated to be reciprocated therealong. Carriages 30 and 31 support, in addition to other parts, the opposite ends of an electrical resistance heating element in the form of a fine wire 32 which constitutes the cutter element of this invention and which is engageable with the upper surface of a glass blank or sheet S to provide surface contact, localized heat thereto for thermally severing the same, as will hereinafter be described in detail. One particular wire product which has been used successfully as an electrical resistance element is a nickel-chromium alloy sold by the Drivers-Harris Company of Harrison, N.J. under the trademark "Nichrome 5." While this product is preferable, it should be understood that any suitable wire material having high electrical resistivity and oxide-resistant properties and which will not deteriorate under elevated thermal conditions can be used in lieu of "Nichrome 5," if desired.

Figure 2:
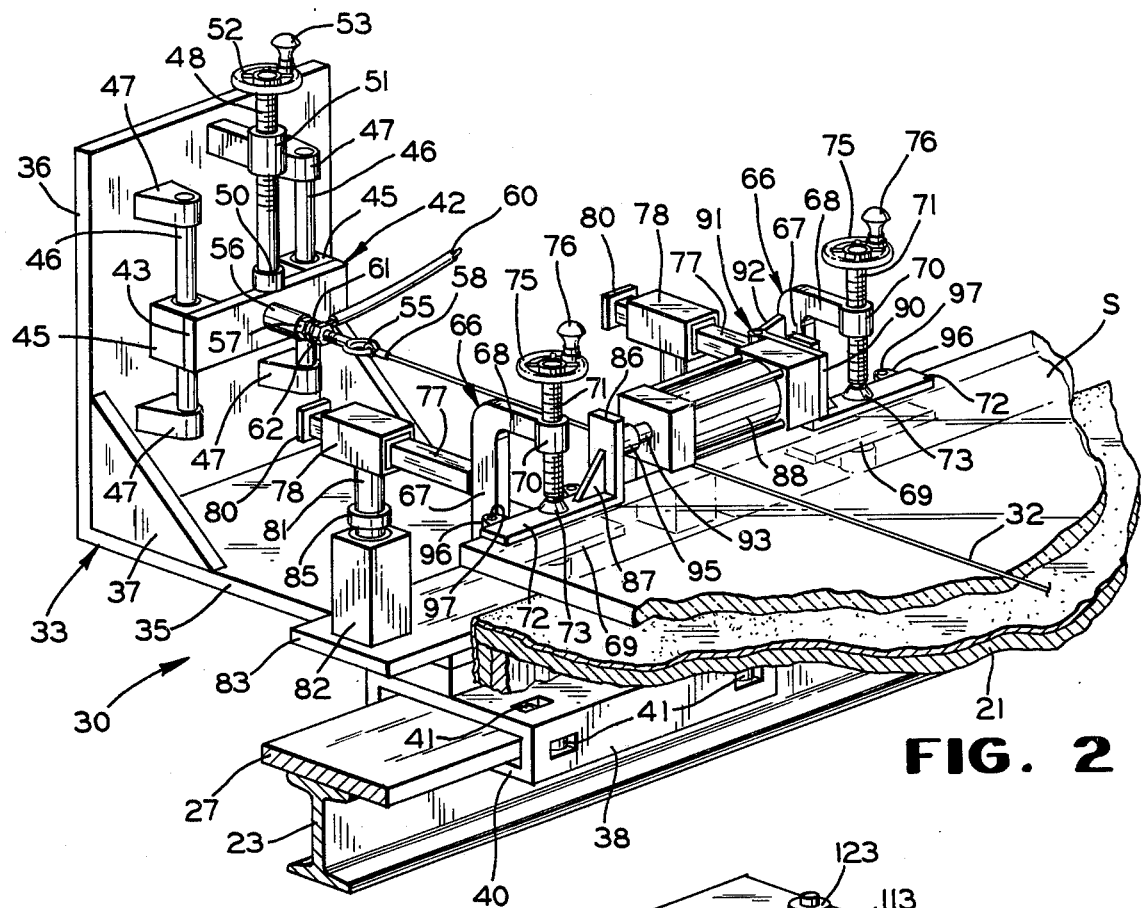
FIG. 2 is a fragmentary perspective view, on an enlarged scale, showing the mounting for one end of the electrical resistance heating element and the glass spreading apparatus associated therewith.

As best shown in FIG. 2, carriage 30 comprises a generally L-shaped frame 33 formed of horizontal and vertical plates 35 and 36 welded or otherwise fixedly secured together and reinforced by suitable gussets 37. The horizontal plate 35 is suitably, rigidly affixed to a slide member 38 of a generally box-like configuration fitted about guide rail 27 and having inturned flanges 40 extending inwardly beneath the rail 27. A plurality of roller bearings 41 are mounted in the slide member 38 for rolling, anti-friction engagement with the top, bottom and edge surfaces of rail 27 to facilitate movement therealong.

The means for mounting one end of the electrical resistance element or wire 32 includes a slide 42 comprised of a plate 43 secured to a pair of spaced bearing blocks 45 for receiving and sliding on laterally spaced runners or shafts 46 extending vertically along plate 36 and which are mounted at their opposite ends in lugs 47 rigidly secured to and extending outwardly from vertical plate 36. Thus, slide 42 is mounted for vertical reciprocal movement on runners 46 relative to the carriage frame 33. The means for reciprocating slide 42 includes an upright screw 48 affixed at its lower end to slide 42 and journalled for rotation in a suitable bearing 50. Screw 48 is threaded through a fixed nut 51 connected to frame plate 36 so that rotation of the screw 48 effects axial movement thereof to raise or lower slide 42 as desired. A hand wheel 52 provided with a suitable knob 53 facilitates manual rotation of the screw 48.

The means for connecting wire 32 to slide 42 includes an eye bolt 55 threaded into an anchoring stud 56 attached to and projecting outwardly from the plate 43 of slide 42 and fixed in place by a suitable lock nut 57. The end of wire element 32 is provided with a suitable terminal 58 having a looped portion threaded through the eye bolt 55. Electrical current is supplied to element 32 by a conductive lead 60 connected at one end to a suitable power source (not shown) and having a terminal 61 at the other end mounted on the threaded portion of eye bolt 55 and sandwiched between lock nut 57 and a nut 62.

Carriage 31 is similar to carriage 30 and like parts are identified by the same reference characters in FIG. 1. Carriage 31 differs from carriage 30 by mounting the anchoring stud 56 for the other end of electrical resistance wire 32 to the piston rod 63 of a fluid actuating cylinder 65 secured to slide 42, rather than directly onto slide 42. The cylinder 65, connected to a suitable source of fluid under pressure (not shown), imposes a predetermined tension on the wire 32 to maintain it in a taut condition against the upper surface of the glass sheet S. The opposed anchoring studs 56 are in axial alignment and, via vertically adjustable slides 42, are disposed in a common horizontal plane slightly below the upper surface of the glass sheet to be severed. This, together with a predetermined arched configuration formed on the upper surface of the table 21, serves to maintain the wire 32 in continuous contact throughout the upper surface of the sheet S along the entire length of the desired line of cut.

In order to prevent dissipation of some of the thermally induced stresses in physically moving the severed pieces apart, mechanical means are provided to physically move the severed glass portions apart as cutting progresses and thereby reserve all of the available thermal energy solely for effecting the cut. To this end, a pair of laterally spaced C-clamps, generally designated 66 (FIG. 2), are mounted on carriage 30 for clamping the glass blank or sheet S on opposite sides of the intended cut. Each clamp 66 comprises a web 67 having vertically spaced upper and lower horizontal extensions 68. The lower extension supports a fixed lower jaw member 69 while the upper extension 68 is provided with a nut 70 for threadably receiving an upright screw 71 having an adjustable jaw member 72 affixed to the lower end thereof as by means of a universal joint 73. The upper end of screw 71 is provided with a hand wheel 75 having a knob 76 to facilitate manual turning thereof.

The web 67 of each C-clamp 66 is provided with an integral, horizontally extending slide bar 77 telescopically received in a bearing block 78 for free reciprocal sliding movement. A flange 80 formed on the distal end of bar 77 serves as a stop limiting inward movement of the bar and thereby C-clamp 66. Bearing block 78 is provided with an integral rod 81 projecting vertically downwardly therefrom and which is freely slidably and rotatably received in a bearing block 82 carried by support plate 83 rigidly secured to the horizontal plate 35 of carriage 30. Rod 81 is provided with an enlarged diameter portion forming a shoulder 85 which serves as a stop for limiting downward movement of rod 81 and thereby C-clamp 66. It will be seen that the above arrangement permits each C-clamp to be moved axially horizontally towards and away from table 21 and vertically relative thereto. Also, C-clamp 66 can be pivoted in a horizontal direction about an axis defined by freely rotatable rod 81 between an operative glass engageable position adjacent table 21 shown in FIG. 2 and an inoperative, out-of-the-way, glass disengageable position (not shown).

As best shown in FIG. 2, the adjustable jaw 72 of each C-clamp 66 is in the form of an elongated flat member provided at one end thereof with an upright plate 86 welded or otherwise fixedly secured thereto and reinforced by a gusset 87. Means are provided for physically moving the opposed plates 86 and thereby the two C-clamps 66 apart, such means preferably comprising a fluid actuating cylinder 88 mounted at its head end to one leaf 90 of a pivotal hinge assembly 91, the leaf 90 in turn secured to one of the upright plates 86. The other leaf 92 of hinge assembly 91 is attached at its outer edge to the web 66 of the adjacent C-clamp 66. Thus, cylinder 88 is attached to one of the C-clamps 66 for movement therewith. Cylinder 88 is provided with the usual reciprocal piston (not shown) connected to a piston rod 93 having an abutment member 95 adapted to engage and bear against the opposite plate 86 forming a part of the adjustable jaw 72 of the other C-clamp 66. Thus, fluid under pressure from a suitable source (not shown) directed to the head end of the cylinder 88 forces the piston therein and the attached piston rod 93 outwardly against plate 86 to force the two C-clamps 66 apart.

Each adjustable jaw 72 also is provided with spaced stop members 96 adapted to engage the leading edge of glass sheet S to properly position the associated jaw 72 thereon. These stops 96 are fitted with guide pins 97 projecting downwardly therefrom for insertion in aligned openings (not shown) formed in similar spaced stop members (also not shown) affixed to the lower jaw 69. Accordingly, each set of upper and lower jaws 72, 69 are maintained in vertical alignment during relative movement toward and away from each other. For a more detailed illustration of these jaw structures and/or any part of the clamps 66 or carriages 30,31, reference may be had to said aforementioned pending application, Ser. No. 767,051.

The mode of operation of the apparatus so far described is as follows:

With C-clamps 66 swung away from the table 21 in an out-of-the-way position, a large glass blank or sheet S is placed and properly oriented on the upper convexly shaped surface of table 21. The weight of the glass causes it to conform to the shape of the slightly arched configuration of the supporting surface of table 21, thus avoiding any undesirable stress development in the upper surface of the sheet. The carriages 30 and 31 are then moved along their respective guide rails 27 and 28 and positioned therealong to vertically align the electrical resistance wire 32 with a desired line of cut. When the wire is properly aligned with the desired line of cut, the slides 42 are lowered to bring the wire into engagement with the upper surface of the sheet coincident with the desired line of cut, the wire also assuming the convex curvature imparted to the glass upper surface to maintain it in continuous, uninterrupted contact throughout with the glass surface. The opposite ends of the wires projecting past the table end portions can be disposed just slightly lower than the table end portions to assure this continuous glass contact along the entire length of the glass.

After the wire 32 is properly oriented against the glass surface, the C-clamps 66 are swung into position on opposite sides of wire 32, moving them axially and vertically as required, to place the respective jaws 69 and 72 below and above the glass sheet and inwardly of the edges thereof as limited by the stop members 96. Screws 71 are then rotated by turning wheel 75 to bring jaws 72 into engagement with the sheet S and securely clamp the same between jaws 72 and 69. Fluid under pressure is then introduced to the head end of cylinder 88 to extend piston rod 93 and bring abutment member 95 into engagement with the jaw plate 86 under a relatively light load.

An edge score is formed on the leading edge of the sheet in alignment with the desired line of cut to initially weaken the tension layer of the sheet S and thereby facilitate start of the cut. If desired, this can be done before the wire 32 and clamps 66 are brought to their glass engaging positions. The electrical resistance heating element or wire 32 is then energized and the heat generated thereby is transmitted directly by conduction into the glass along the length of the desired line of cut to produce a thermal differential line through the thickness of the sheet. The conductive heat applied along this thermal differential line relieves some of the compression stresses in the compression layer as it migrates inwardly through the sheet thickness while proportionally increasing the tensile stresses in the intermediate tension layer until the latter reaches a level which, when assisted by the initially weakened scored edge, creates a split or fracture in the tension layer along the thermal differential line. This fracture is propogated outwardly through the compression layers to the opposite surface of the glass sheet, the cut starting at the scored edge and progressively running along the entire desired line of cut to the opposite or trailing edge of the glass sheet.

Just as the cut is started and advances from the scored edge a short distance, say from about 6 to 10 inches, fluid under increased pressure is introduced to the head end of the cylinder 88 to extend piston rod 93 and urge abutment member 95 against the adjacent jaw plate 86, forcing the C-clamps 66 to move away from each other to effect a spreading apart of the severed glass portions, e.g. sheet S and strip S' (FIG. 1), clamped thereby. The stroke of the piston rod 93 is just sufficient to physically move the severed portions apart without expending any thermal energy. Thus, the heavy severed glass portions are moved relatively away from each other by a mechanical force against the resistance offered by the felt covered table. This mechanical assist conserves the thermal energy that would otherwise be consumed in moving the severed glass portions apart so that all the available thermal energy is reserved and utilized solely for effecting the long running cut. Accordingly, the thermal energy necessary can be drastically reduced with a consequent reduction in the power requirements generating such energy. Just before reaching the remote or opposite end of the sheet, say within approximately an inch therefrom, the running cut often curves or flares away from the intended line of cut. While this does not pose any serious problem because the severed strip S', which contains the flare adjacent the edge thereof, is trimmed to length along a transverse line inwardly of such flare so that the finished strip S' has a uniform width throughout. However, the present invention contemplates preventing such deviation or flare at the end of the running cut so as to consistently form true straight cuts from starting end to exit end.

Figure 3:
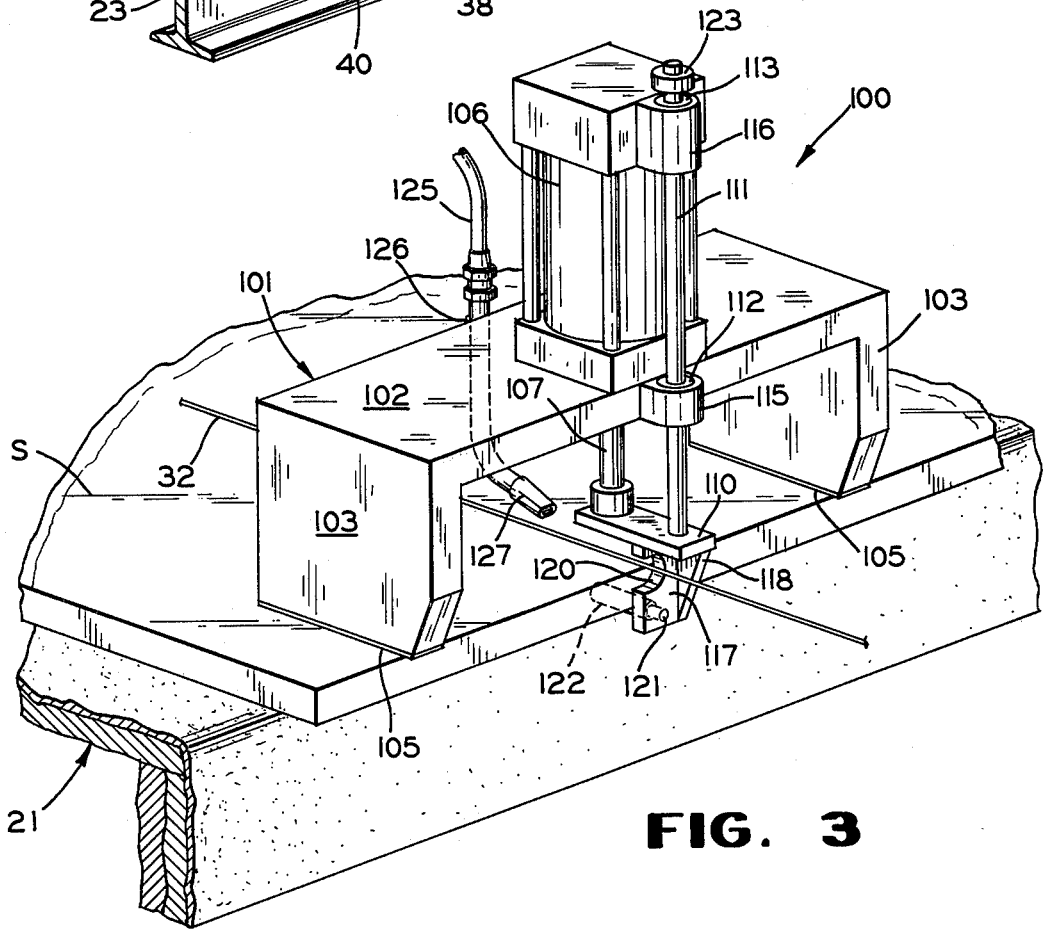
FIG. 3 is a fragmentary perspective view, on an enlarged scale, showing the force applying apparatus constructed in accordance with this invention for use in conjunction with thermal cutting apparatus.
Figure 4:
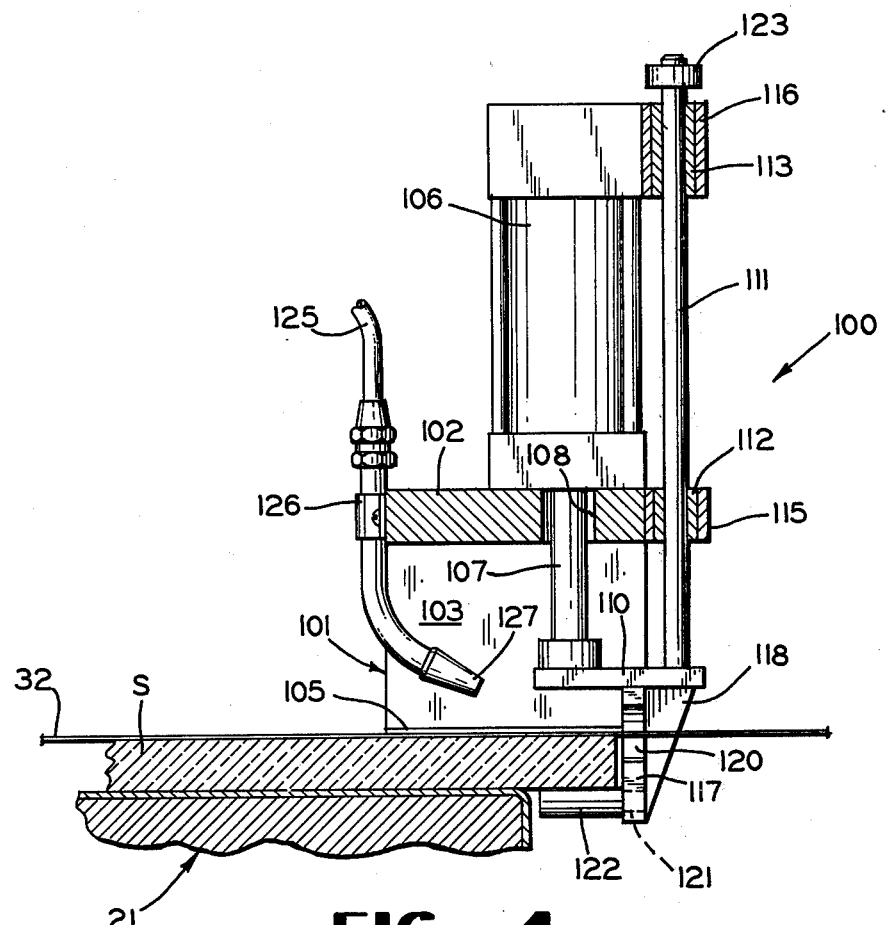
FIG. 4 is a vertical sectional view, on an enlarged scale, of the apparatus shown in FIG. 3.
Figure 5:
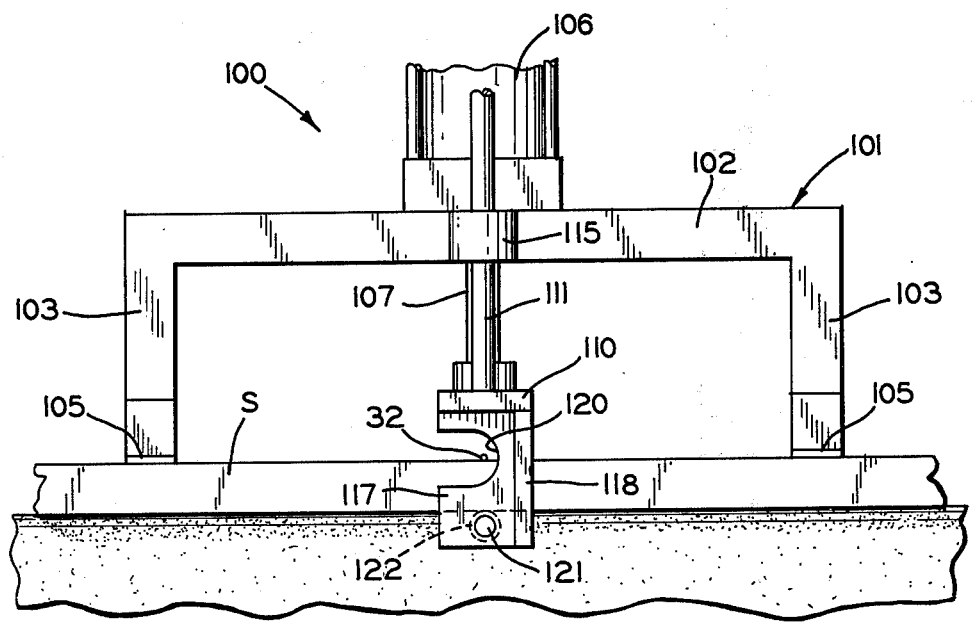
FIG. 5 is a fragmentary end elevational view, on an enlarged scale, of the apparatus shown in FIG. 3.

To this end, and in accordance with this invention, force applying or flexing means are provided adjacent the remote end of the intended line of cut for assisting the above-described apparatus in completing the cut and containing the same within the desired path at such remote end by the application of a bending moment or breaking force thereto. Referring now to FIGS. 3, 4 and 5, such means, generally identified by numeral 100, comprises a box-like frame structure 101 adapted to rest on the glass sheet S to be severed and is formed of a horizontally extending base member 102 and a pair of right angularly related side walls 103 extending vertically downwardly from the opposite ends of the base member 102. The lower ends of the side walls 103 are provided with soft, protective pads 105 to avoid marring and scratching of the upper surface of sheet S.

An actuating cylinder 106 is mounted directly onto the upper surface of base member 102 and is provided with the usual piston (not shown) connected to a piston rod 107 projecting downwardly through an opening 108 (FIG. 4) formed in the base member 102. The lower end of piston rod 107 is welded or otherwise fixedly secured to one end of a horizontally extending plate 110 preferably of generally rectangular configuration in plan. A vertically extending guide post 111 is suitably secured at its lower end to plate 110 adjacent the other end thereof and extends upwardly through vertically aligned, spaced guide bushings 112 and 113 mounted in suitable bores formed in lugs 115 and 116 affixed to the longitudinal edge of base member 102 and the head end of cylinder 106, respectively.

A tool carrier in the form of a vertically extending bracket 117 is suitably rigidly secured to and extends downwardly from horizontal plate 110. A gusset plate 118, rigidly secured to the underside of plate 110 and bracket 117, offers rigidity and support for bracket 117. The carrier 117 is formed with an arcuate cut-out section or groove 120 to provide substantial clearance for the passage of the resistance wire element 32 therethrough.

A finger 121 in the form of a pin or cylindrical rod constitutes the work engaging, force applying or flexing tool and is mounted at its one end in bracket 117 and projects laterally outwardly therefrom in a direction normal to the plane of bracket 117. A resiliently yieldable sleeve 122 of a non-abrasive material, such as neoprene for example, surrounds finger 121 to prevent marking of the under surface of sheet S. The axis of finger 121 is adapted to be vertically aligned with wire resistance element 32 to engage the underside of the glass sheet in vertical registry with the intended line of cut.

A collar 123 is mounted adjacent the upper end of guidepost 111 and serves as a stop limiting downward movement thereof and thereby the bracket 117 and finger 121. This prevents that portion of bracket 117 defining the upper edge of groove 120 from contacting and disturbing or displacing the wire resistance element 32.

A supply conduit 125 is releasably attached to the rear edge of the base member 102 as by means of a suitable clamp 126. The conduit 125 terminates in a nozzle 127 directed at an angle to the upper surface of the glass sheet S and along the intended line of cut adjacent the trailing end thereof. The other end of the conduit is connected to a suitable source (not shown) of cooling air. The purpose of the cooling air will be described in connection with the operation of the force applying means 100.

In operation, the entire assembly 100 is placed on the glass sheet to be cut adjacent the end thereof remote from the scored edge of the sheet and centered relative to the resistance wire 32 with bracket 117 disposed parallel and in close proximity to the trailing edge of the sheet. The assembly 100 is positioned to orient finger 121 beneath the sheet in vertical alignment with resistance wire 32 and the intended line of cut. Cylinder 106 is actuated to raise piston rod 107 and the finger 121 upwardly into engagement with the underside of sheet S. A predetermined amount of upwardly directed breaking force is imposed on the underside of the sheet by the pressure biased finger 121 and approximately one-half of such predetermined force is exerted downwardly by each of the frame side walls 103 at equally spaced lateral distances from the resistance wire 32. Such downward forces are the opposite reaction forces resulting from the upwardly directed breaking force exerted by finger 121. These forces are applied on the glass sheet at the trailing end thereof prior to introducing electric current through resistance wire 32. Thus, as the running cut approaches its exit, forces acting upwardly in registry with the intended line of cut and forces acting downwardly on opposite sides thereof will flex the glass sheet along such desired line of cut to assist the thermal energy generated by wire 32 in fracturing or severing the glass at the trailing end thereof along the desired line of cut and control or contain the running cut along such line.

Because of the physical breaking or flexing force coupled with the thermal force force acting at the trailing or exit end of the cut, there is a possibility that a fissure could start at the trailing edge of the sheet, as well as at the prescored leading edge of the sheet, with the two running cuts approaching each other in slightly axially offset paths. The application of cooling air to the sheet at such trailing end precludes such an undesirable occurrence by maintaining the trailing end cooler than the remainder of the sheet along the intended line of cut, thereby assuring the formation of only one fissure which is initiated at the leading, prescored edge of the sheet. The combined thermal and physical forces at the trailing end of the cut become effective only when the running cut approaches such trailing end.

As a specific example in successfully producing repeated true linear cuts in ¾ and ⅝ inch thick glass sheets approximately 200 inches long, finger 121 preferably is ¼ inch in diameter and approximately one inch long, the distance within which curving or flaring of the cut from the far or remote end thereof would otherwise occur. A force of approximately 235 pounds is applied upwardly against the sheet via finger 121 and 117.5 pounds is directed downwardly at the frame side walls 103, respectively, which are equally spaced from the resistance wire 32 at a distance of approximately five inches. It should be understood that the above dimensions and forces are illustrative only and that the structural dimensions and forces applied can vary, as desired or as dictated by the thickness of the glass sheet to be cut. Also, while the force applying means 100 is described in connection with a surface contact heating element in combination with a glass spreader as hereinbefore described, it should be understood that the force applying means 100 of this invention is in no way restricted thereto, but has utility in any thermal severing process with or without a glass spreader and whether or not the heat applied is by conduction as herein described or by radiation from a non-surface contact source. Moreover, one skilled in the art of glass cutting can find practical applications other than in thermal cutting procedures for the force applying apparatus of this invention.

From the foregoing, it is apparent that the objects of the present invention have been fully accomplished. As a result of this invention, a new and useful method and apparatus is provided for making elongated thermal cuts in relatively thick glass sheets by employing, in conjunction with thermal energy, a force applying flexing or means at the trailing end of a running cut to consistently ensure straight, linear cuts from starting edge to the trailing edge of the glass sheet. The deviation or flare from the intended line of cut adjacent the trailing end of a running cut that otherwise usually occurs in prior art thermal severing procedures is virtually eliminated to produce a true linear cut from starting end to exit end of the running cut.

It is to be understood that the form of the invention herewith shown and described is to be taken as an illustrative embodiment only of the same, and that various changes in the shape, size and arrangement of parts, as well as various procedural changes, may be resorted to without departing from the spirit of the invention.

We claim:

1. A method of cutting glass along a desired line of cut comprising: scoring one edge of a glass sheet, applying concentrated heat against one surface of the glass sheet along a narrow line coincident with a desired line of cut causing said sheet to split progressively from said scored edge in a running cut along said line towards the opposite edge of said sheet, and flexing said sheet along said desired line of cut adjacent said opposite edge of said sheet to assist in the severance of said sheet and confine said running cut to said intended line of cut.

2. A method according to claim 1, wherein the flexing of said sheet includes applying a predetermined force against the opposite surface of said sheet along said intended line of cut and lesser forces on the opposite sides of said intended line of cut against said one surface of said sheet.

3. A method according to claim 2, wherein said lesser forces are applied at equidistant spaces from said intended line of cut.

4. A method according to claim 1, including cooling said sheet along said intended line of cut adjacent said opposite edge to preclude initiation of said running cut at said opposite edge.

5. A method according to claim 1, wherein the flexing of said sheet includes applying a predetermined force against the opposite surface of said sheet along said intended line of cut and lesser forces on the opposite sides of said intended line of cut at equidistant spaces therefrom against said one surface of said sheet, and cooling said sheet along said intended line of cut adjacent said opposite edge to preclude initiation of said running cut at said opposite edge.

6. An apparatus for cutting glass along a desired path comprising: means for supporting a sheet of glass having a scored edge, means for applying concentrated heat against one surface of the glass sheet along a narrow path coincident with a desired line of cut to cause said sheet to split progressively from said scored edge in a running cut along said line towards the opposite edge of said sheet, and means adjacent the opposite edge of said sheet for flexing said sheet along said desired line of cut adjacent said opposite edge to assist in the severance of said sheet and confine said running cut to said desired line of cut.

7. An apparatus according to claim 6, wherein said flexing means includes means for applying a predetermined force against the opposite surface of said sheet along said desired line of cut.

8. An apparatus according to claim 7, wherein said flexing means includes means for applying lesser forces against said one surface of said sheet on opposite sides of said desired line of cut.

9. An apparatus according to claim 6, wherein said flexing means comprises a frame having spaced glass engaging members bearing against said one surface of said glass sheet on opposite sides of said desired line of cut, and a force applying tool mounted on said frame and engageable against the opposite surface of said glass sheet along said desired line of cut.

10. An apparatus according to claim 9, including power means operatively connected to said tool for urging said tool against said opposite surface with a predetermdined force and said members against said one surface with less forces.

11. An apparatus according to claim 6, including means for cooling said sheet along said desired line of cut adjacent said opposite edge to preclude initiation of said running cut at said opposite edge.

12. An apparatus according to claim 6, wherein said flexing means comprises a frame having spaced glass engaging members bearing against said one surface of said glass sheet on opposite sides of said desired line of cut, and a force applying tool mounted on said frame and engageable against the opposite surface of said glass sheet along said desired line of cut, power means operatively connected to said tool for urging said tool against said opposite surface with a predetermined force and said members against said one surface with lesser forces, and means for cooling said sheet along said desired line of cut adjacent said opposite edge to preclude initiation of said running cut at said opposite edge.

* * * * *